July 21, 1964
J. R. MADEIRA
3,141,543
NON-METALLIC FULLY FLEXIBLE IDLER
Filed March 8, 1961
2 Sheets-Sheet 1
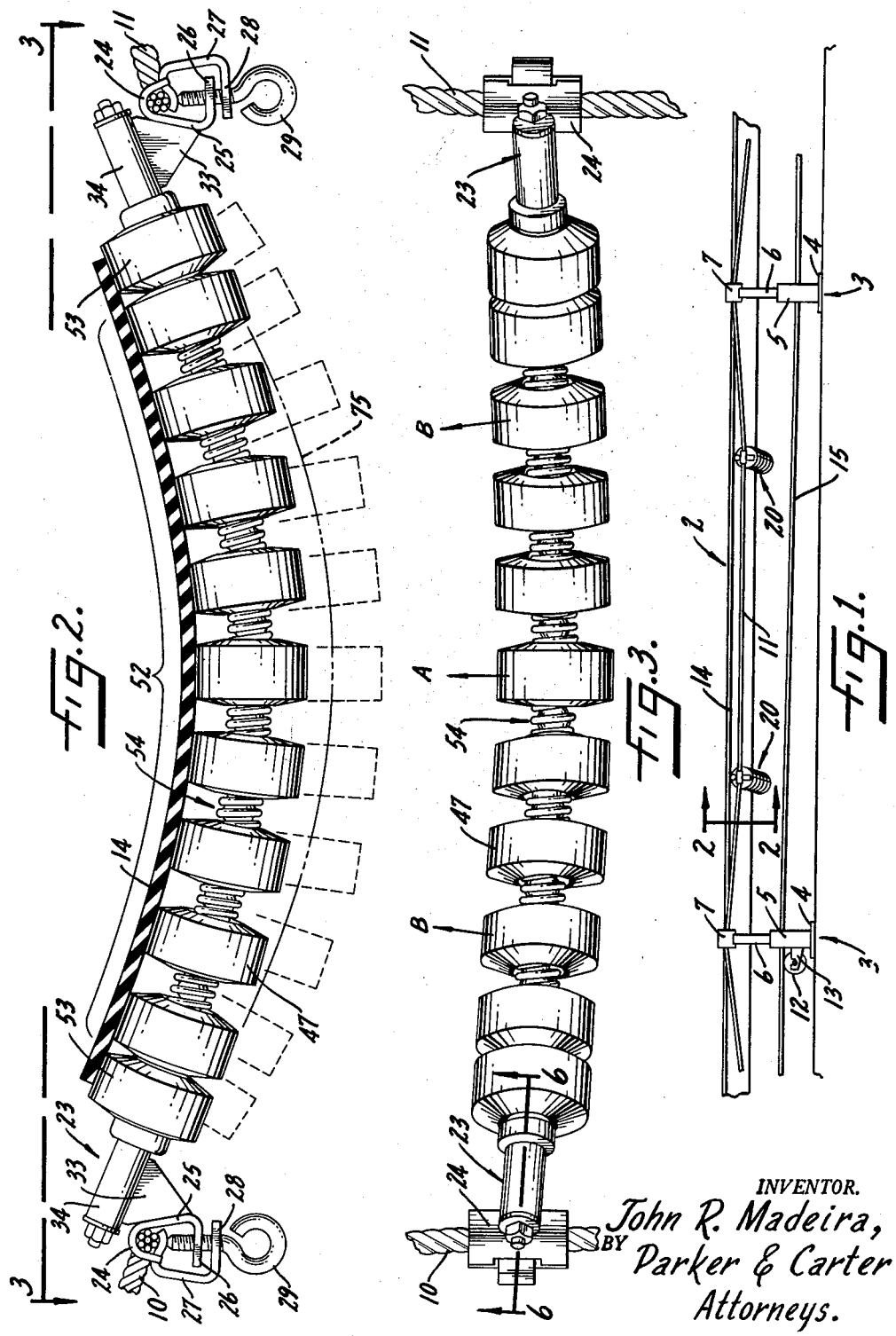
INVENTOR.
John R. Madeira,
BY Parker & Carter
Attorneys.

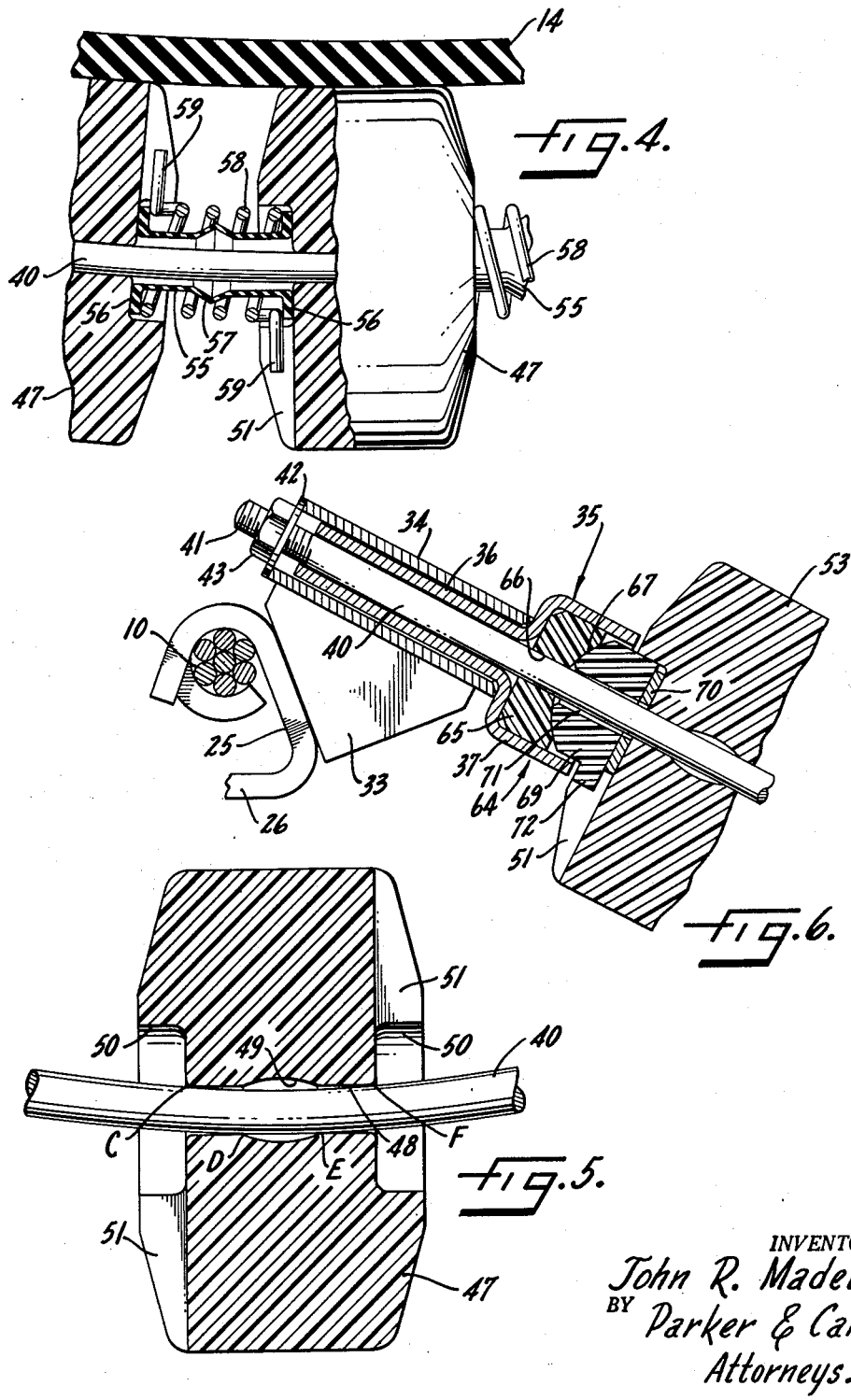

United States Patent Office 3,141,543
Patented July 21, 1964

3,141,543
NON-METALLIC FULLY FLEXIBLE IDLER
John R. Madeira, Chicago, Ill., assignor to Goodman Manufacturing Company, Chicago, Ill., a corporation of Illinois
Filed Mar. 8, 1961, Ser. No. 94,181
11 Claims. (Cl. 198—192)

This invention relates in general to rope sideframe conveyors and specifically to a new and improved troughing idler assembly for use in such conveyors.

A primary object of the invention is to provide, in a rope sideframe conveyor, an idler assembly having a plurality of non-metallic rollers carried by a single, non-rotatable, resilient shaft.

Another object is to provide, in a rope sideframe conveyor, an idler assembly having a resilient shaft which is maintained in bowed relationship upstream of belt travel to insure good belt training characteristics.

Another object is to provide an idler assembly including a single, non-rotatable, resilient shaft which is preformed into a bowed, troughing relationship in its free state to take advantage of the optimum physical characteristics of the shaft material.

Still another object is to provide, in a troughing idler assembly, idler rollers which have improved bearing surfaces and do not become wobbly in use.

A further object is to provide an idler assembly having resilient spacers for maintaining proper spacing between the individual rollers, said spacers being flexible with the troughing assembly to thereby avoid permanent deformation or damage to the rollers.

Another object is to provide flexible sleeves or bellows between individual idler rollers for retaining a lubricant therein and preventing an accumulation of dirt or other foreign matter.

Still another object is to provide an idler assembly of the aforedescribed character in which the idler roller spacing is such that the edge of the conveyor belt is not subjected to wear as it moves laterally across the idler assembly.

Yet another object is to provide unique mounting means for suspending a troughing idler assembly of the aforedescribed character from rope sideframes including a new and improved bearing construction between the mounting means and the outermost idler rollers.

These and other objects of this invention will be found in the following specification and claims wherein like reference numerals identify like parts throughout.

The invention is shown somewhat diagrammatically in the accompanying drawings wherein:

FIGURE 1 is a side elevation of a portion of a rope sideframe conveyor having the troughing idler assemblies of this invention, FIGURE 2 is a view taken substantially along line 2—2 of FIGURE 1, FIGURE 3 is a view taken substantially along line 3—3 of FIGURE 2, FIGURE 4 is an enlarged view in partial section showing the relationship of the resilient shaft, idler rollers and spacer means, FIGURE 5 is an enlarged view in section, with parts removed, of an idler roller and its supporting resilient shaft illustrating the bearing relationship between the shafts and roller, and FIGURE 6 is a view taken substantially along line 6—6 of FIGURE 3.

A portion of a rope sideframe conveyor is shown generally at 2 in FIGURE 1. The conveyor 2 includes a series of longitudinally aligned, generally regularly spaced support standards 3 adapted to support a pair of rope sideframes in longitudinally extending, generally parallel relationship.

Each of the support standards 3 includes a pair of ground engaging plates 4, each plate having a sleeve 5 extending upwardly therefrom. The sleeves may be connected together by a cross bar or tube to form a conventional H-frame. Pipes 6 are received in each of the sleeves 5 and are adjustable to vary the rope level. The pipes 6 carry rope seats 7 at their upper ends, the rope seats 7 including conventional means for securing side ropes 10 and 11 thereto. Since an understanding of the structure of the H-frame (which may be conventional) is not essential to an understanding of the invention, it is not further illustrated.

Certain of the support standards 3, depending upon the topography of the terrain, also carry return rollers 12. The return rollers are suspended on brackets 13 welded to the upstanding sleeves 5 of the support standards. An endless conveyor belt, including a carrying reach 14 and a return reach 15 is supported by the idler assemblies and return rollers 12.

Idler assemblies 20 are suspended between the longitudinally extending wire ropes 10 and 11 at spaced intervals, as best seen in FIGURE 1. The idler assemblies in the illustrated conveyor are identical in construction and only one will be described in detail. In any given conveyor, a portion or all of the idler assemblies may be identical to the described structure, depending on operational factors such as terrain, etc.

As best seen in FIGURES 2, 3 and 6, each of the idler assemblies includes a pair of roller assembly mountings 23. The mountings 23 are mirror images of each other and for all practical purposes identical in construction, and consequently only one will be described in detail.

Each mounting 23 includes a rope clamp formed by a longitudinally extending rope seat 24 having a downwardly extending flange 25 and an outwardly directed lip 26. An internally threaded aperture is formed in the lip 26 and a U-shaped clamp 27 having an aperture in its bottom flange 28 is forced into engagement with the side rope by a screw 29.

A generally vertical, inwardly extending web 33 is welded to the downwardly extending flange 25. Each web 33 carries a sleeve 34 secured to its upper edge. In this instance, the webs and sleeves are shown formed as separate elements, but it will be obvious that they could be formed in one piece. FIGURE 3 illustrates the orientation of the webs 33 and their corresponding sleeves 34 in relation to the direction of belt travel A. The webs 33 are secured to the flanges 25 in such a manner that the outer ends of the sleeves 34 are canted upstream relative to the direction of conveyor belt travel.

As seen in FIGURE 6, each of the sleeves receives a liner 35 having a tubular extension 36 seated inside the sleeve and an expanded, cup-shaped inner end 37 extending from the sleeve.

A resilient shaft 40 is journaled at its opposite ends in corresponding sleeve and liner assemblies. The ends of the shaft extend outwardly from sleeves 34 and are threaded as at 41 to receive washers 42 and anchoring nuts 43. Each shaft 40 is normally formed of a spring steel having substantial resilience. Prior to incorporation into the idler assembly the shaft is preformed into an arc of such a configuration that in its free state it is substantially identical in shape to bowed attitude it will normally assume while supporting a loaded conveyor belt. The degree to which the shaft should be "prebowed" can easily be calculated knowing the expected load factors and the type of rope sideframe conveyor with which it will be used. The "prebowed" shaft is subsequently subjected to heat treatment which relieves stresses built up during the bowing operation and results in the "prebowed" shaft having optimum strength and physical characteristics. The ends of the shaft are canted from a perpendicular to the rope sideframes. This amount of cant is governed by the angle at which the webs 33 and consequently sleeves 34 are secured to corresponding rope clamps.

A plurality of identically constructed idler rollers 47 are mounted for rotation on shaft 40. The rollers are comprised of a long wearing plastic material which may be, for example, an epoxy resin composition. As best seen in FIGURE 5, each roller has a bore 48 extending therethrough, the bore having a diameter slightly larger than the shaft 40 which it receives. A recess 49 is formed adjacent the center of the roller by conventional means.

The diameter of the bore is slightly larger than the diameter of the shaft. Since the shaft is resilient, it will be slightly curved as it passes through the shaft. The combination of an oversized bore and a bowed shaft provides a multi-point bearing contact between the shaft and bore. In this instance, the points of support are indicated at C, D, E, and F. It will be understood that the shaft need not be resilient to achieve the stabilizing advantages of this construction; it need only be bowed along that portion of its length received in the bore.

A cup-shaped depression is formed in each side of each roller concentric with the bore 48. A notch 51 is formed in each side of the roller and extends into communication with a depression 50. Notches 51 on opposite sides of a single roller ordinarily lie 180 degrees apart upon the circumference of the roller to insure proper balance thereof. The orientation of the notches in a single roller is not critical, however.

The rollers 47 between the end rollers, indicated at 52, are held in spaced relationship by spacer assemblies 54 surrounding the shaft 40. The end rollers 53 are not separated from the outermost of the interior rollers 47 by spacers and, in fact, bear directly against the sides of these outermost interior rollers. This relationship is best illustrated in FIGURES 2 and 3.

Each spacer assembly 54 includes a rubber bellows or sleeve element 55 concentric with the shaft 40 and having beaded or flanged opposite ends, as at 56. An expanded central section 57 provides a bellows effect. A torsion spacer spring 58 surrounds the sleeve 55. Opposite ends of the spring 58 are seated in corresponding opposed depressions 50 in the sides of adjoining rollers 47 and overlie the flanged ends 56 of the bellows sleeve 55. Each spring end terminates in a radially outwardly disposed extension 59 which seats in a corresponding notch 51 in the adjacent roller. The spring radially locks the adjoining rollers together in resilient relationship, as will be readily understood upon viewing FIGURE 4.

A bearing assembly 64 is mounted between the outer end of each outer roller 53 and the cup portion 37 of sleeves 35. Each bearing assembly includes an annular block 65 of non-metallic material such as nylon seated inside the cup 37. Each block 65 has a bore 66 through which shaft 40 extends. A tight fit is formed between the bore and the shaft. A concave depression 67 is formed in the inner face of block 65. A bearing block 69 is seated in the cup-shaped depression 50 of a corresponding outer roller 53, and a washer 70 is positioned between the block and depression. A bore 71 formed in the block 69 is slightly larger in diameter than the shaft so as to permit free rotation of the shaft with respect to the block. An extension 72 at the base of each block 69 extends into notch 51 in the adjoining roller and is effective to lock the bearing block 69 for rotation with the roller. Convex outer surface 73 on the block 69 seats in concave inner surface 67 in block 65. Nylon has been found to provide extremely good bearing surfaces having long wearing characteristics but it will be understood that other similar non-metallic materials might be used.

The interior rollers 52, exterior rollers 53, and spacer assemblies 54 are in compression between the bearing assemblies 64. The amount of compression is easily adjusted by adjusting the nuts 43 on the threaded ends 41 of the resilient shaft.

The use and operation of this invention are as follows:

The idler assembly of this invention utilizes a prebowed resilient metal shaft which might be steel, for example. A bow, indicated by dotted lines 75 in FIGURE 2, is established on the shaft. This bow is substantially equivalent to the arc which an idler assembly will assume under full load conditions. This particular construction is designed to utilize the optimum physical characteristics of the resilient shaft. The force necessary to install the idler between the ropes will resist a portion of the load. When the shaft assumes the fully loaded, dotted line position 75 of FIGURE 2, both the upper and lower surfaces will be in tension. The optimum physical characteristics of the shaft will thus be utilized.

The rollers which form the roller assembly disposed along the shaft are formed of an epoxy resin type plastic, though other plastics are also adaptable. The bore 48 in the center of each roller slips easily over the rod 40 and provides a bearing surface for the roller. By providing a recess 49 around the circumference of the bore 48 adjacent its center, wear at the ends of the bore does not result in a rounding effect at the center of the bore. This rounding effect was frequently encountered in roller constructions heretofore employed and resulted in a narrowing of the effective roller mounting on the shaft with a resultant wobbling of the rollers as they rotated. The recess 49 provides a multiple point shaft support which effectively limits wobbling and consequently increases roller life.

The sleeve 56 of each spacer assembly is filled with grease to provide a grease or lubricant reservoir or retaining means for the individual rollers with which it is associated. In addition, foreign matter is excluded from the region around the bearing surfaces by the spacer sleeves 56, thus preventing scoring and unusually rapid wear of the surfaces.

Torsion springs 58 overlying the sleeves 55 maintain the spacing of the rollers. As best shown in FIGURE 4, each torsion spring 58 maintains its associated bellows 57 in lubricant tight engagement with the rollers it contacts. The spring extensions 59 prevent excessive rotation of the rollers with respect to one another and connects adjacent rollers to one another in yieldably spaced relationship. It will be obvious that as the idler assembly troughs, and adjacent rollers work with respect to one another by wobbling in directions transverse to their nominal plane of rotation the coil springs will flex in accordion-like manner to absorb the dimensional changes between the individual rollers. In conjunction with this, the bellows 57 on sleeves 55 also flex or yield in a direction generally parallel with the shaft as troughing takes place.

The two end rollers 53 bear directly against the adjoining rollers and thus the spacing between the two outermost rollers is limited to a small gap, best seen in FIGURE 2. Because of the limited size of this gap, the edges of the conveyor belt carrying reach 18 do not catch on the end rollers as the belt rides laterally of the idler assembly. This construction prevents fraying and general deterioration of the belt edges. Belts can be utilized for much longer periods without replacement, and training of the belt is easier.

Because of the canted relationship of the sleeves 34 to the ropes, it will be obvious that the shaft will also be forced into a bowed attitude upstream of the direction A of conveyor belt travel. Under little or no load, the outermost rollers of the assembly will then tend to force the conveyor belt inwardly in the direction illustrated by the arrows B in FIGURE 3 as the belt carrying reach travels over each idler assembly. This, in effect, provides a continuous training effect on the belt since movement of the belt sideways will result in an increase in the total force exerted by that side on the belt. The increased force urges the belt back to center.

The shaft 40 in its free state has been bowed into the shape it will assume in the assembly when the conveyor is subjected to maximum or full load. When the idler assembly is assembled and suspended between the parallel side ropes, the tension of the side ropes tends to straighten out the shaft 40 and it will assume the relationship shown in solid lines in FIGURE 2. Subsequently, upon being subjected to heavy loading, the assembly will trough and shaft 40 will bow into what approaches its free state arc or shape. The optimum physical characteristics of the shaft will thus be best utilized under full load conditions.

What has been shown and described is a new and improved troughing idler assembly. It will be understood, however, that the foregoing description is intended to be illustrative only and not definitive. Accordingly, the invention should be limited only by the scope of the appended claims.

I claim:
1. A troughing idler assembly especially adapted for use in a belt conveyor, said troughing idler assembly including, in combination,
    a tension transmitting shaft,
    a plurality of rollers carried by the shaft,
    said rollers being rotatable with respect to the shaft,
    lubricant retaining means between adjacent rollers,
    said lubricant retaining means being yieldable in a direction generally parallel with the shaft to thereby retain lubricant when adjacent rollers work with respect to one another in directions transverse to their normal plane of rotation and,
    means for simultaneously maintaining the lubricant retaining means associated with a pair of adjacent rollers in lubricant tight engagement with the rollers, and for connecting the pair of rollers to one another in yieldably spaced relationship.

2. The troughing idler assembly of claim 1 further characterized in that the shaft is bowed in its unstressed condition into an arc substantially coordinate with the arc assumed by the troughing idler assembly when loaded.

3. The troughing idler assembly of claim 1 further characterized in that each roller has a bore formed therein for the reception of the shaft,
    said bore having a slightly greater internal diameter along its length than the external diameter of the shaft to thereby provide multiple bearing points for the shaft.

4. The troughing idler assembly of claim 3 further characterized in that the bore has an expanded portion intermediate its ends to thereby provide a minimum of four bearing points.

5. The troughing idler assembly of claim 1 further characterized in that the connecting means includes structure for enabling the connected rollers to rotate at least initially about the shaft at dissimilar rotational speeds whereby rotation of one roller with respect to the shaft can commence prior to rotation of another roller under substantially the same rotative impetus.

6. The troughing idler assembly of claim 1 further characterized in that said connecting means includes a torque transmitting spring interposed between adjacent rollers.

7. The troughing idler assembly of claim 6 further characterized in that the ends of each torque transmitting spring extend generally radially outwardly from the spring axis and into abutting force transmission engagement with an associated roller.

8. The troughing idler assembly of claim 1 further characterized in that the lubricant retaining means is a longitudinally expandable and contractable flexible sleeve.

9. The troughing idler assembly of claim 1 further including
    mounting means for connecting each end of the shaft to an associated conveyor side rope,
    said mounting means including rope clamps arranged for securement to each of the side ropes,
    sleeve means carried by each of the rope clamps,
    said sleeve means having cupped shaped portions at their inner ends,
    a bearing assembly between each of said cup-shaped portions and the outermost end of the rollers, each bearing assembly including a pair of non-metallic bearing blocks,
    one of said bearing blocks in each pair of blocks being keyed into the adjacent roller,
    said shaft extending through the bearing blocks and into the sleeve means.

10. The troughing idler assembly of claim 9 further characterized in that said pairs of bearing blocks include a first block having a concave bearing surface and a second block having a convex bearing surface, the bearing surfaces being in bearing engagement with one another.

11. The troughing idler assembly of claim 1 further including mounting structure for canting the rollers into an upstream position relative to the direction of travel of a conveyor belt to thereby dispose the rollers into a belt training condition.

References Cited in the file of this patent
UNITED STATES PATENTS

| | | |
|---|---|---|
| 66,091 | Jenks | June 25, 1867 |
| 188,750 | Moore | Mar. 27, 1877 |
| 981,471 | Proal | Jan. 10, 1911 |
| 1,833,179 | Robins | Nov. 24, 1931 |
| 2,820,541 | Barnish et al. | Jan. 21, 1958 |
| 2,895,594 | Smith | July 21, 1959 |
| 2,942,721 | Kidd et al. | June 28, 1960 |
| 3,059,757 | Baechli | Oct. 23, 1962 |

FOREIGN PATENTS

| | | |
|---|---|---|
| 1,049,774 | Germany | Jan. 29, 1959 |